United States Patent [19]
Buchanan

[11] Patent Number: 4,805,407
[45] Date of Patent: Feb. 21, 1989

[54] THERMOMECHANICAL ELECTRICAL GENERATOR/POWER SUPPLY FOR A DOWNHOLE TOOL

[75] Inventor: Ronnie J. Buchanan, Duncan, Okla.

[73] Assignee: Halliburton Company, Duncan, Okla.

[21] Appl. No.: 173,011

[22] Filed: Mar. 18, 1988

Related U.S. Application Data

[63] Continuation of Ser. No. 841,924, Mar. 20, 1986, abandoned.

[51] Int. Cl.[4] .................................................. F03G 1/04
[52] U.S. Cl. ...................................... 60/517; 60/644.1; 60/669; 60/721; 290/1. A
[58] Field of Search .................... 290/1 A, 52; 60/517, 60/651, 671, 670, 668, 669, 721, 644.1

[56] References Cited

U.S. PATENT DOCUMENTS

| | | | |
|---|---|---|---|
| 3,349,247 | 10/1967 | Birkestrand | 60/669 X |
| 3,597,766 | 8/1971 | Buck | 60/517 |
| 3,732,728 | 5/1973 | Fitzpatrick | 73/151 |
| 4,069,673 | 1/1978 | Lapeyre | 290/1 A |
| 4,354,352 | 10/1982 | Hoke et al. | 60/669 X |

*Primary Examiner*—Allen M. Ostrager
*Attorney, Agent, or Firm*—Mark E. McBurney; E. Harrison Gilbert, III; Joseph A. Walkowski

[57] ABSTRACT

A downhole tool for an oil or gas well includes a self-contained power supply having a housing in which a primary fuel source, a Stirling cycle engine, and a linear alternator are disposed. The primary fuel source includes a radioisotope which, by its radioactive decay, provides heat to operate the Stirling engine which in turn drives the liner alternator to provide a suitable electrical output for use by the circuit of the downhole tool.

4 Claims, 1 Drawing Sheet

THERMOMECHANICAL ELECTRICAL GENERATOR/POWER SUPPLY FOR A DOWNHOLE TOOL

This is a continuation of application Ser. No. 841,924 filed Mar. 20, 1986 now abandoned.

BACKGROUND OF THE INVENTION

This invention relates generally to downhole tools energized by self-contained power supply apparatus and methods for energizing downhole tools and more particularly, but not by way of limitation, to electrical power supplies and methods incorporating an external combustion engine in powering an electrical circuit in a downhole tool.

In drilling and completing oil or gas wells, various activities need to be performed downhole. For example, downhole pressure and temperature readings need to be taken when conducting a drill stem test, and perforating guns need to be activated when perforating a casing prior to fracturing a formation. These two specific operations, as well as many others, are performed by tools which need to be energized when the tools are at their downhole locations. This energization is typically electrical energization, at least during some phase of the downhole operation.

In the past and at present, such electrical energization has been and is provided through a wireline from a source at the surface or through a self-contained battery pack located within the downhole tool. The cells in the battery pack have been chemical batteries, such as silver oxide or lithium types. The use of fuel cells (e.g., containing liquid hydrogen and oxygen) in a self-contained pack has been contemplated, but to my knowledge has never been commercially implemented.

One shortcoming of the wireline energization technique is the relative difficulty in using the wireline rather than merely using a "slick line" or retaining cable, which relative difficulty is well recognized in the industry. Additionally, because of the length of the wireline, electrical losses occur which would not occur if the power supply were wholly contained within the downhole tool. Finally, the requirement of a wireline does not lend itself to long-term tests, as the wireline truck or skid and power supply must remain at the well site. Moreover, the presence of a wireline or any cable in the well bore prohibits quickly closing off the well in an emergency unless one is willing to cut the wireline or cable and then "fish" it out at a later time.

Although battery packs overcome the two aforementioned shortcomings of wireline energization, the battery packs have relatively limited operating lives and electrical capacities whereby the operation of the downhole tool, both as to how much can be driven by a battery pack and as to how long energization can be sustained, is limited. When testing multiple parameters or conducting a long-term test, e.g., weeks or months, such limitations become particularly apparent. Although more batteries can be added to provide more capacity, such additional batteries at some point can no longer be accommodated because of the size constraints which are imposed upon all downhole tools by the size of the well bore and other known factors. Also, even though batteries can be replaced so that operations can be continued, such replacement requires a trip of the pipe string in which the battery packs are incorporated out of and back into the well bore, thereby increasing the expense of the operation. Such battery packs also have limitations as to the types of wells in which they can be readily used; this is specifically referring to deep wells (e.g., wells from two to five miles deep) because of the high pressures and temperatures which are encountered in these wells and which can detrimentally affect the chemical operations within the battery cells.

Thus, there is the need for an improved power supply for a downhole tool, which power supply is self-contained and wholly mounted within the downhole tool for obviating the necessity of a wireline, thereby achieving an advantage similar to that of the battery packs. Furthermore, however, such an improved power supply should overcome the shortcomings of the battery packs by providing for a longer operating life and by providing for more output capacity within a smaller volume than are provided by the battery packs known to me and by providing for reliable usage even in deep wells where temperatures are greater than those in which presently available batteries can operate.

SUMMARY OF THE INVENTION

The present invention overcomes the above-noted and other shortcomings of the prior art and meets the aforementioned needs by providing a novel and improved power supply apparatus and method for a downhole tool. The present invention combines nuclear, mechanical and electrical aspects into an overall combination having the following features and advantages: very high power density, stable operation, long operating life, and minimal moving parts which neither rotate nor require a lubricating system or valves. The present invention is also simple, reliable and relatively inexpensive.

The present invention provides a downhole tool comprising a power supply including a housing; thermal energy source means, disposed in the housing, for generating thermal energy; an electrical energy generator disposed in the housing; external combustion engine means, disposed within the housing, for actuating the electrical energy generator in response to the thermal energy from the thermal energy source means; and means for connecting the electrical energy generator with an electrical circuit, disposed in another housing in which the first-mentioned housing is disposed, for performing a function in a downhole environment of a well in response to electrical energization from the electrical energy generator. In the preferred embodiment the thermal energy source means includes a radioisotope, the external combustion engine means includes a Stirling cycle engine, and the electrical energy generator includes a linear alternator.

The present invention also provides a method of energizing an electrical circuit contained in a downhole tool. This method comprises inserting a fuel capsule into a housing in heat transfer relationship with a Stirling cycle engine retained in the housing, the fuel capsule including a radioisotope; inserting the housing into the downhole tool; and electrically connecting the electrical circuit to a linear alternator disposed in the housing and mechanically connected to the Stirling cycle engine. This method further comprises generating, at the output of the linear alternator and in response to the radioisotope, an electrical output within the range between approximately 0.5 watts and approximately 2.5 watts for application to the electrical circuit of the downhole tool. In the preferred embodiment this output is achieved while constraining the linear displacement of a movable member of the linear alternator to approximately ⅛ inch relative to a stator of the linear alternator. The step of inserting the housing into the downhole tool includes retaining the housing within a receptacle region having a diameter of approximately one inch and a length of not greater than approximately twenty-four inches.

Therefore, from the foregoing, it is a general object of the present invention to provide a novel and improved power supply apparatus and method for a downhole tool. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

Figure 1:
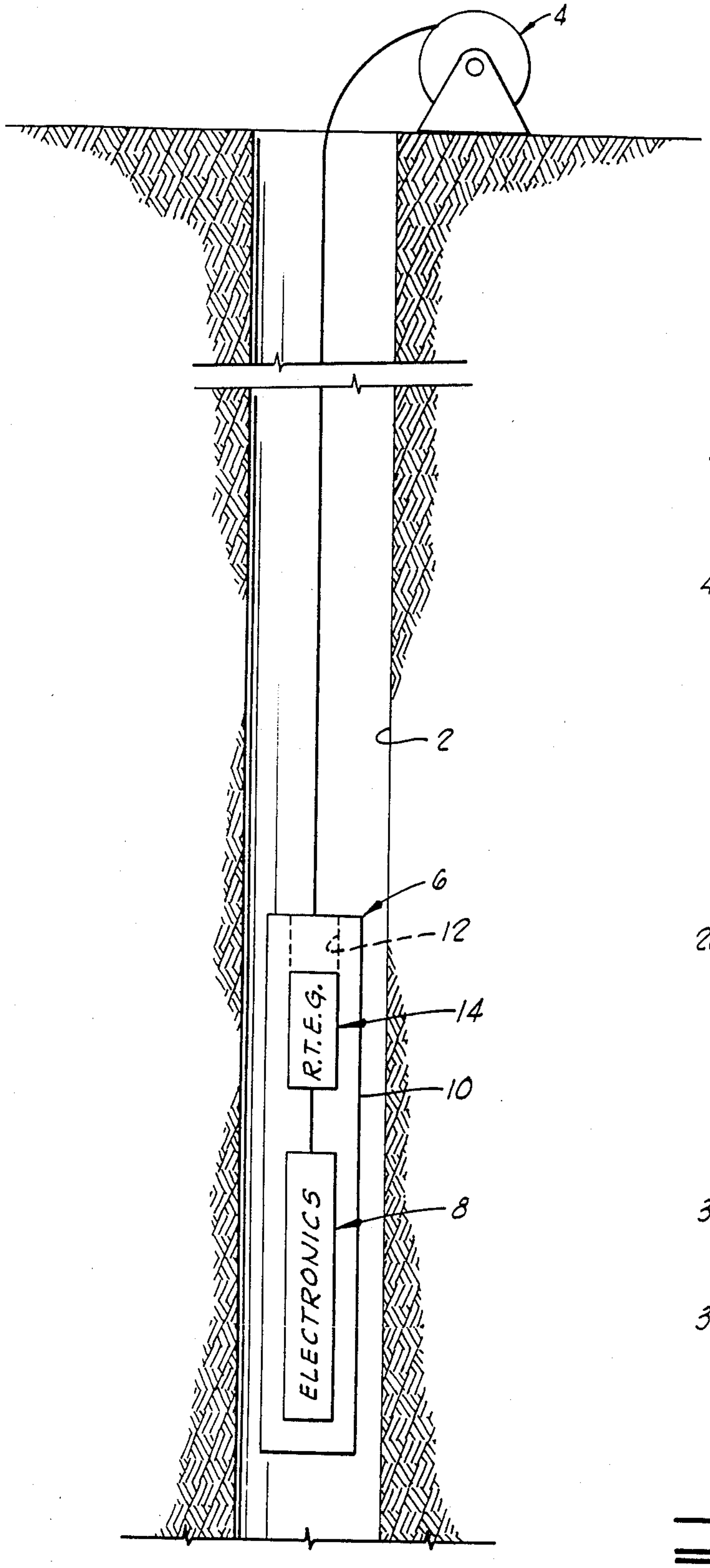
FIG. 1 is a schematic illustration of a well having a downhole tool including a power supply constructed in accordance with the present invention.

Schematically illustrated in FIG. 1 is a well 2, particularly an oil or gas well, at the mouth of which is disposed a conveyancing means 4, such as a winching system of a more complex design than is schematically shown in FIG. 1, for lowering and raising a downhole tool 6. Conveyancing means 4 is also contemplated to include a pipe or tubing string in which downhole tool 6 is incorporated or disposed.

The downhole tool 6 has an electrical circuit or system 8 for performing a function of whatever type might be needed in the downhole environment of the well 2. Specific examples of the downhole tool 6, but not by way of limitation, are an electronic pressure and temperature gauge or an electrically-actuated perforating gun. The electrical circuit 8 is disposed or contained in a suitable housig 10 of a type known to the art.

The housing 10 has a receptacle 12 for receiving a power supply 14 which provides the electrical energization to which the electrical circuit 8 responds, thereby enabling the function to be performed. In the preferred embodiment subsequently described, the power supply 14 is a radioisotope thermomechanical electrical generator (thus the label R.T.E.G. used in FIG. 1).

In the preferred embodiment the receptable 12 is sized to accommodate the size of the power supply 14 subsequently more particularly specified. The size specifications or limitations are important in the preferred embodiment of the present invention in that they provide a more compact self-contained power supply than is provided by battery packs known to me for similar applications. This is of considerable significance to a downhole tool designer who must work within some absolute size constraints imposed by the size of the well bore, the tubing disposed in the well bore, and the formation with which the tool is to be used, for example.

Figure 2:
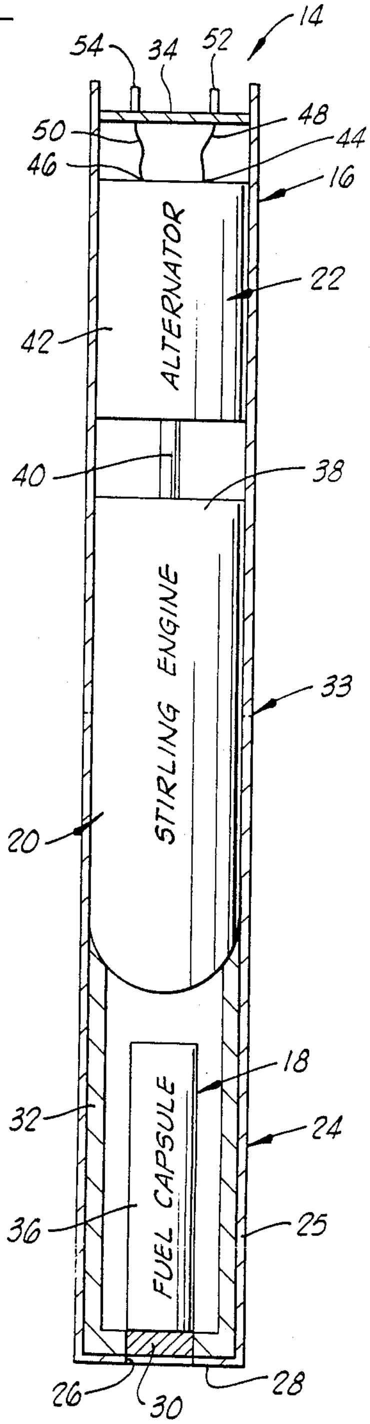
FIG. 2 is a diagram of the preferred embodiment of the power supply of the present invention.

With reference to FIG. 2, the preferred embodiment of the power supply 14 will be described. Broadly, the power supply 14 includes housing means 16 for being received within the receptacle 12 of the housing 10 of the downhole tool 6. The power supply 14 also includes thermal energy source means 18, disposed in the housing 16, for generating thermal energy which powers an external combustion engine means 20, also disposed within the housing 16, for converting the thermal energy into mechanical motion. In the preferred embodiment the external combustion engine means 20 is defined as a Stirling cycle engine having a driving output coupled to conversion means 22, also disposed within the housing 16, for converting the mechanical motion from the engine 20 to energy usable by the system 8 within the downward tool 6. Since the system 8 is an electrical system in the illustrated preferred embodiment, this energy is, of course, electrical energy; however, other suitable output energies could be derived in correspondence with the nature of some other type of functional system which might be used in the downhole tool 6 in place of the electrical system 8. Also included in the power supply 14 are transfer means for transferring thermal energy from the thermal energy source 18 to the engine 20 and means for connecting the output from the conversion means 22 to the system 8.

The housing 16 of the preferred embodiment is defined by a tubular member 24 having a cylindrical side wall 25 with a maximum outer diameter of, preferably, not greater than approximately one inch and an outer length of, preferably, not greater than approximately twenty-four inches. More broadly, the maximum outer diameter is less than the inner diameter of the downhole tool 6 and the outer length is less than the length of the downhole tool so that the housing 16, and thus the entire power supply 14, can be fully received entirely within the downhole tool 16. The specific dimensions are particularly advantageous because they are significantly less than typical dimensions of battery packs which are now accommodated in down hole tool designs. Thus, with the present invention a more compact overall downhole tool is provided, thereby saving material and fabrication costs.

At one end of the tubular member 24 there is an opening 26 through which the thermal energy source 18 can be moved into and removed from the housing 16. In the FIG. 2 embodiment, this opening 26 is defined through an end wall 28 of the tubular member 24. This end wall 28 is disposed transversely to the cylindrical side wall 25 of the tubular member 24. The opening 26 is closable by means of a closure cap 30 which is connected by mating threads within the opening 26. Because the thermal energy source 18 is received in this end of the tubular member 24, the interior surface of the end wall 28 an this portion of the tubular member 24 are lined with a suitable insulation material 32.

Alternatively, the tubular member 24 can be constructed in two sections which are threadedly connected as at reference numeral 33 shown in FIG. 2. With this construction no end opening 26 and closure cap 30 are needed so that the end wall 28 is continuous across the entire end area of that portion of the tubular member 24; this permits better insulating of the thermal energy source 18. Other suitable constructions of the housing 16 and other suitable techniques for inserting and removing the thermal energy source 18 can, of course, also be used as would be well known in the art.

The other end of the tubular member 24 has an end wall 34 disposed transversely to the side wall 25. This end wall 34 is spaced linearly from the end wall 28 at the opposite end of the cylindrical side wall 25.

The thermal energy source 18, movable into and out of the housing 16 through the opening 26 (or other suitable alternative construction), is in the preferred embodiment a unitary member constructed in the form of a fuel capsule 36 made of, at least in part, a suitable radioisotope having a half-life sufficient to provide a sufficiently long-lived primary energy source for the power supply 14 so that power source replacements are not needed once an operation commences, thereby making extra trips out of and into the well unnecessary. There is a sufficient quantity of the radioisotope in the fuel capsule 36 so that the power supply 14 has an overall electrical output within the range of approximately 0.5 watt to approximately 2.5 watts. In the preferred embodiment it is specifically contemplated that the electrical output from the conversion means 22 need be only something less then approximately one watt, which output is ultimately the result of the capacity of the radioisotope primary power source contained in the fuel capsule 36. The fuel capsule 36 is removable from the housing 16 independently of any of the other components of the power supply 14 so that this primary fuel source can be readily replaced if ultimately needed. The fuel capsule 36 is surrounded by a suitable heat transfer medium, such as a heat pipe, defining the transfer means for transferring the thermal energy generated by the radioactive decay of the radioisotope within the fuel capsule 36 to the external combustion engine 20.

As previously mentioned, the external combustion engine means 20 of the preferred embodiment includes a Stirling cycle engine. The Stirling cycle is a well known thermodynamic cycle and various engines operating in accordance with this cycle are well known. In general, these engines have two pistons: one of which is preferred to as a displacer for moving a working gas between hot and cold chambers, and the other of which is referred to as a power piston for providing a mechanical motion output. The movements of these pistons are in response to thermal energy, or heat, applied from a suitable source, which in the preferred embodiment of the present invention is the radioisotope of the fuel capsule 36. As shown in FIG. 2, the Stirling cycle engine is disposed adjacent the fuel member 36 so that the heat generated by the radioactive decay of the radioisotope in the fuel capsule 36 is transferred to the Stirling cycle engine through the heat transfer medium within the volume surrounding the capsule 36. In FIG. 2 the Stirling cycle engine is specifically identified by the reference numeral 38, and the mechanical motion is provided through a coupling member 40, such as the piston rod of the power piston known to be contained within the Stirling cycle engine 38.

The conversion means 22 is connected to the coupling member 40 so that the conversion means 22 is actuated by that motion, which motion is derived in response to the thermal energy from the thermal energy source means 18. In the preferred embodiment shown in FIG. 2, the conversion means 22 is an electrical energy generator (specifically identified as a linear alternator 42) which generates a voltage across two terminals 44, 46. For the specific embodiment including a linear alternator, this form of the conversion means 22 includes a stator with which the two terminals 44, 46 are associated and a movable member connected to the coupling member 40 so that relative movement between the stator and the movable member is achieved when the Stirling engine 38 operates. That is, the stator is fixed in a stationary manner relative to the housing 16 and the movable member is fixed relative to the power piston within the Stirling engine 38 so that movement of the power piston moves the movable member relative to the stator. This relative movement generates the electrical voltage by the electromagnetic relationship between the stator and the movable member as is well known in linear alternators. In the preferred embodiment wherein size constraints are important factors, the Stirling engine 38 and the linear alternator 42 are constructed so that this relative movement is constrained to not more than approximately ⅛ inch, but also so that such limited displacement still generates an electrical output sufficient to provide power within the range between approximately 0.5 watt and approximately 2.5 watts. As shown in FIG. 2, the linear alternator 42 is disposed on the side of the Stirling cycle engine 38 opposite the fuel member 36.

The electrical output from the linear alternator 42, which is provided across the terminals 44, 46, is communicated externally of the housing 16 by the connecting means, schematically illustrated in FIG. 2 as including conductive members 48, 50 and output contacts or terminals 52, 54. These elements can be included in a single unitary member which provides both mechanical and electrical coupling of a suitable type for connecting with the circuit 8 to be energized by the power supply 14. This connecting, or coupling, means is preferably connected to or through the end wall 34 of the housing 16 so that the connection is made within the confines of the maximum outer diameter of the tubular member 24.

The above-described preferred embodiment of the apparatus defining the power supply 14 is also comprehended within a method of energizing an electrical circuit contemplated by the present invention. This method comprises inserting the fuel capsule 36 into the housing 16 in heat transfer relationship with the Stirling cycle engine 38, inserting the housing 16 into the downhole tool 6, and electrically connecting the electrical circuit of the downhole tool to the linear alternator 42. The importance of this method is in utilizing the fuel capsule 36, having the radioisotope, with a Stirling cycle engine in a downhole tool so that an improved technique if energizing such a downhole tool is provided. In particular, this method includes within the step of inserting the housing into the downhole tool the step of retaining the housing within a receptacle region having a diameter of approximately one inch and a length of not greater than approximately twenty-four inches. This method also comprises generating, at the output of the linear alternator 42 and in response to the radioisotope in the fuel capsule 36, an electrical output within the previously defined range of between approximately 0.5 watt and approximately 2.5 watts for application to the electrical circuit of the downhole tool. This power generating is achieved in the preferred embodiment of the method in conjunction with constraining the movement of the movable member of the linear alternator 42 relative to the stator of the linear alternator 42 to not more than approximately ⅛ inch. Although one may consider these specific design parameters to be merely matters of design choice, as comprehended with the method of the present invention these parameters are specific critical limitations of the preferred methodology by which an improved power supply technique is achieved within the constricted downhole environment to which the method is limited.

In summary, the radioisotope thermomechanical electrical generator of the preferred embodiment power supply 14 utilizes the energy released by the decay of the radioisotope within the fuel capsule 36 to provide heat to operate the Stirling engine 38 which will in turn drive the linear alternator 42 to provide a suitable electrical power output, such as in the specific embodiment an output of less than approximately one watt of AC or DC power for use in oil field instrumentation. The power supply 14 will operate for a long period of time, depending upon the half-life of the radioisotope, and over a wide temperature range, from less than 0° C. to over 200° C. because of the constant energy output of the radioactive source. These operating parameters define the invention in a manner which is particularly useful in deep oil or gas wells.

Additional or alternative specific design criteria contemplated for a specific implementation of the preferred embodiment includes an approximately one-inch maximum outer diameter and a maximum length of preferably not greater than approximately two feet, an approximately ½-inch diameter by approximately six-inch length well at the heat source end of the housing for receiving a similarly sized fuel capsule, a suitable heat transfer mechanism, such as a heat pipe, to transfer heat from the radioisotope capsule to the head of the Stirling engine with suitable insulation as needed in the side wall and end of this section of the housing, a threaded end cap in a ½-inch well to secure the fuel capsule in place and to provide maximum thermal contact between the surfaces of the fuel capsule and the well, an overall efficiency of 15% or better at 200° C., isolated electrical output terminals across which approximately 10–20 vac rms are provided from DC to as high a frequency as possible with a power output between approximately 0.5 watt and approximately 2.5 watts, and with a power drain two times normal for two seconds out of 100 seconds.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts and the performance of steps can be made by those skilled in the art, which changes are encompassed within the spirit of this invention as defined by the appended claims.

What is claimed is:

1. A power supply for use in a subterranean well bore of a limited diameter, said power supply being for a generally tubular, longitudinally extending oil or gas well downhole tool deployable in said well bore and having a system requiring energy from said power supply and having a receptacle for receiving said power supply, comprising:

housing means for being received within the receptacle of the downhole tool, said housing means including a tubular member having a maximum outer diameter less than an inner diameter of the downhole tool and having an outer length less than the length of the downhole tool so that said tubular member is receivable entirely within the downhole tool, said tubular member including:

a cylindrical side wall across which said maximum outer diameter is defined;

a first end wall disposed transversely to said side wall at one end thereof, said first end wall having an opening defined therethrough for receiving a closure cap so that when said closure cap is removed from said opening a fuel capsule can be inserted into or removed from said tubular member through said first end thereof; and a second end wall disposed transversely to said side wall at another end thereof;

a fuel capsule removably retained inside said housing means said fuel capsule including means for generating thermal energy, wherein said means for generating thermal energy includes a radioisotope;

Stirling cycle engine means, disposed in said housing means immediately adjacent to and in heat transfer relationship to said fuel capsule, for converting said thermal energy to mechanical motion;

conversion means, disposed in said housing means adjacent to said Stirling Cycle engine means and on the opposite side of said Stirling Cycle engine means from said fuel capsule, for converting said mechanical motion to energy usable by the system within the downhole tool, said conversion means including linear alternator means for generating an electrical voltage in response to said Stirling cycle engine means; and connecting means, communicating externally of said housing means, for connecting said electrical voltage from said linear alternator means to the system of the downhole tool, said connecting means including terminal means, disposed through said second end wall of said tubular member, for providing said electrical voltage externally of said housing.

2. A method of energizing an electrical circuit contained in a downhole tool deployable in an oil or gas well, from a power supply including a fuel capsule, housing, Stirling cycle engine, and linear alternator, said method comprising:

constructing the power supply such that the fuel capsule, the housing, the Stirling cycle engine, and the linear alternator are configured for use in a subterranean well bore of a limited diameter;

inserting said fuel capsule into said housing in heat transfer relationship with said Stirling cycle engine retained in said housing, said fuel capsule including a radioisotope;

inserting said housing into the downhole tool;

electrically connecting the electrical circuit to said linear alternator disposed in said housing and mechanically connected to said Stirling cycle engine; and generating, at the output of said linear alternator and in response to said radioisotope, an electrical output within the range between approximately 0.5 watts and approximately 2.5 watts for application to the electrical circuit of the downhole tool.

3. A method as defined in claim 2, wherein the step of inserting said housing into the downhole tool includes retaining said housing within a receptacle region having a diameter of approximately 1 inch and a length of not greater than approximately 24 inches.

4. A method as defined in claim 2, wherein generating an electrical output includes moving, in response to thermal energy from radioactive decay of the radioisotope of the fuel capsule, a power piston of the Stirling cycle engine and a movable member of the linear alternator connected to the power piston not more than approximately ⅛ inch relative to a stator of the linear alternator.

* * * * *

UNITED STATES PATENT AND TRADEMARK OFFICE
CERTIFICATE OF CORRECTION

PATENT NO. : 4,805,407

DATED : 2-21-89

INVENTOR(S) : Ronnie J. Buchanan

It is certified that error appears in the above-identified patent and that said Letters Patent is hereby corrected as shown below:

In column 4, line 8 delete [downward] and insert therefore --downhole--.
In column 4, line 46 delete [an] and insert therefore --and--.
In column 5, line 12 delete [then] and insert therefore --than--.
In column 5, line 30 delete [preferred] and insert therefore --referred--.
In column 6, line 57 delete [with] and insert therefore --within--.

Signed and Sealed this

Twenty-ninth Day of August, 1989

*Attest:*

DONALD J. QUIGG

*Attesting Officer* *Commissioner of Patents and Trademarks*